(12) United States Patent
Hirooka et al.

(10) Patent No.: US 7,913,746 B2
(45) Date of Patent: Mar. 29, 2011

(54) AIR CONDITIONING ARRANGEMENT FOR WORK VEHICLE

(75) Inventors: Yoshimi Hirooka, Sakai (JP); Shoichiro Kawamura, Hannan (JP); Masaki Hayashi, Sakai (JP)

(73) Assignee: Kubota Corporation, Osaka (JP)

( * ) Notice: Subject to any disclaimer, the term of this patent is extended or adjusted under 35 U.S.C. 154(b) by 980 days.

(21) Appl. No.: 11/726,367

(22) Filed: Mar. 21, 2007

(65) Prior Publication Data

US 2008/0110184 A1    May 15, 2008

(30) Foreign Application Priority Data

Nov. 13, 2006 (JP) .................... 2006-306388

(51) Int. Cl.
*B60H 1/00* (2006.01)
*F25B 29/00* (2006.01)

(52) U.S. Cl. ............ 165/42; 165/43; 454/121; 454/126; 454/156; 454/160; 454/161

(58) Field of Classification Search .............. 165/42, 165/43, 41, 202, 203, 204; 454/121, 126, 454/160, 156, 161
See application file for complete search history.

(56) References Cited

U.S. PATENT DOCUMENTS 5,735,338 A * 4/1998 Chevroulet et al. ............. 165/42

FOREIGN PATENT DOCUMENTS

| JP | 07047832 A * | 2/1995 |
|---|---|---|
| JP | 2003-125626 | 5/2003 |
| JP | 2005-160352 | 6/2005 |
| JP | 2005-178783 | 7/2005 |
| JP | 2005-253387 | 9/2005 |
| JP | 2006-020531 | 1/2006 |

* cited by examiner

*Primary Examiner* — John K Ford
(74) *Attorney, Agent, or Firm* — The Webb Law Firm

(57) ABSTRACT

An air conditioning arrangement for a work vehicle having a cabin includes: a hood disposed forwardly of the cabin; an air conditioning unit housed in the hood forwardly of the cabin; and a dashboard provided in a front portion in the cabin. The air conditioning unit includes a rear duct for delivering conditioned air rearward and a front duct having a portion for delivering conditioned air frontward. The front duct further has a portion extending rearward under the air conditioning unit. The dashboard includes an upper outlet, a defrost outlet and a lower outlet. Each of the upper outlet, the defrost outlet and the lower outlet is communicated with either one of the front duct and the rear duct.

4 Claims, 8 Drawing Sheets

Fig.7
Cooling Operation

Fig.8

Cooling/Defogging Operation

Fig.9

Heating Operation

US 7,913,746 B2

AIR CONDITIONING ARRANGEMENT FOR WORK VEHICLE

BACKGROUND OF THE INVENTION

The present invention relates to a structure of an operating unit of a work vehicle that can be used for various purposes including freight transportation use, leisure use and light duty use, etc.

The work vehicle is known to include an operating unit covered by a roof, serving as a sunshade, attached to an overturn protection frame as disclosed in JP2005-178783A.

Work vehicles of this type are desired to include a cabin serving as an operating unit. In this case, air conditioning is necessary in the cabin.

SUMMARY OF THE INVENTION

The present invention has been made to satisfy this demand. It is an object of the present invention to provide a structure of an operating unit of a work vehicle having a comfortably air conditioned cabin that ensures excellent forward visibility, which allows the operator to work in a comfortable environment.

The air conditioning arrangement for a work vehicle having a cabin of the present invention is an air conditioning arrangement comprising: a hood disposed forwardly of the cabin; an air conditioning unit housed in the hood forwardly of the cabin; and a dashboard provided in a front portion in the cabin, the air conditioning unit comprising a rear duct for delivering conditioned air rearward and a front duct comprising a portion for delivering conditioned air frontward, the front duct further comprising a portion extending rearward under the air conditioning unit, the dashboard comprising an upper outlet, a defrost outlet and a lower outlet, wherein each of the upper outlet, the defrost outlet and the lower outlet is communicated with either one of the front duct and the rear duct.

As described above, by delivering the conditioned air discharged from the air conditioning unit separately to the front duct and to the rear duct, it is possible to supply the conditioned air separately to the upper outlet and the lower outlet through different paths. By controlling the paths and the outlets to open or close, it is possible to provide conditioned air suitable according to cooling operation or heating operation.

Because the front duct is extended rearward under the air conditioning unit, it is possible to reduce the occupancy of the air conditioning equipment in the hood, and therefore a reduction in height of the hood can be achieved.

DETAILED DESCRIPTION OF PREFERRED EMBODIMENTS

A preferred embodiment of the present invention will be described below with reference to the accompanying drawings.

Figure 1:
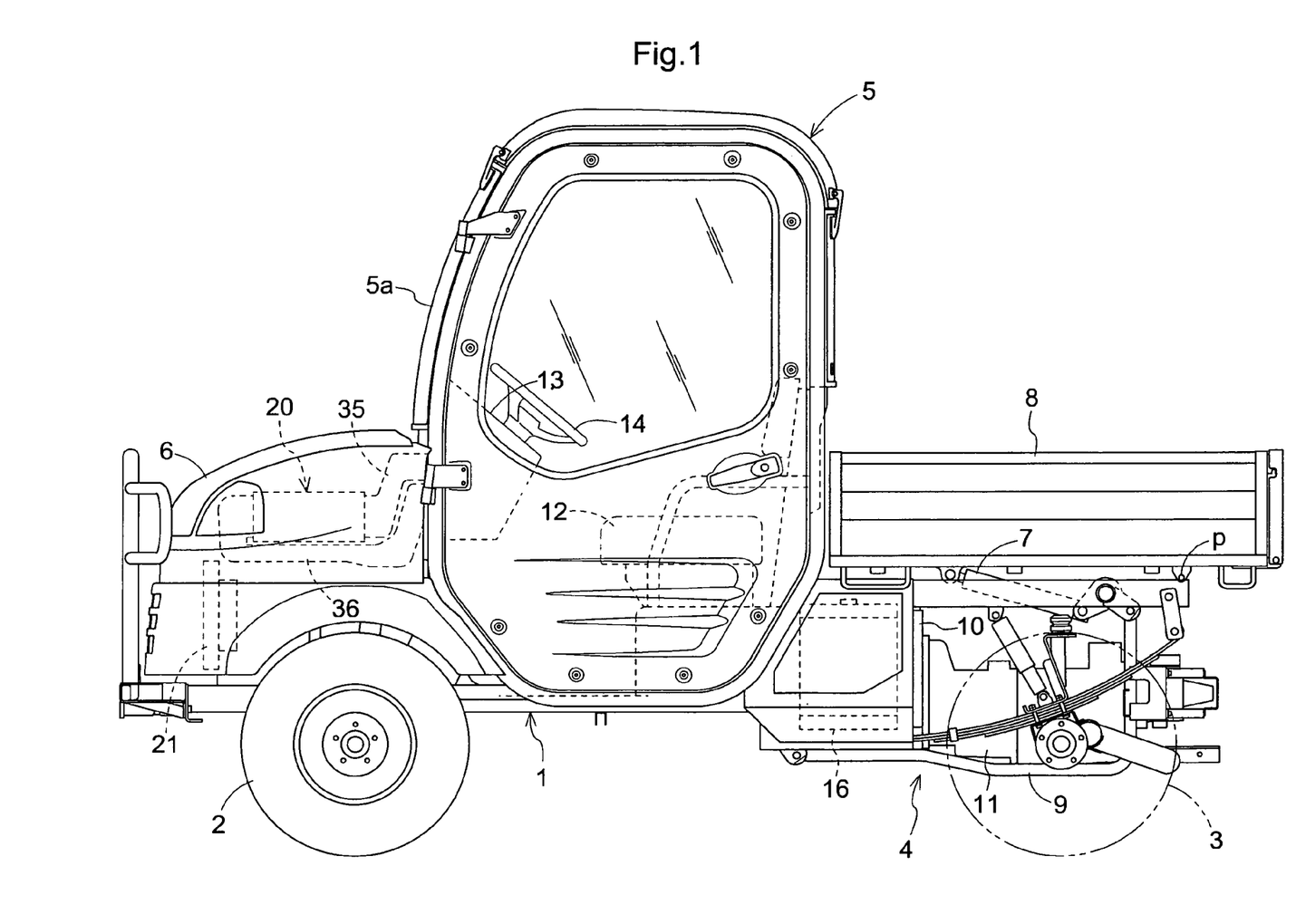
FIG. 1 is an overall side view of a work vehicle.
Figure 2:
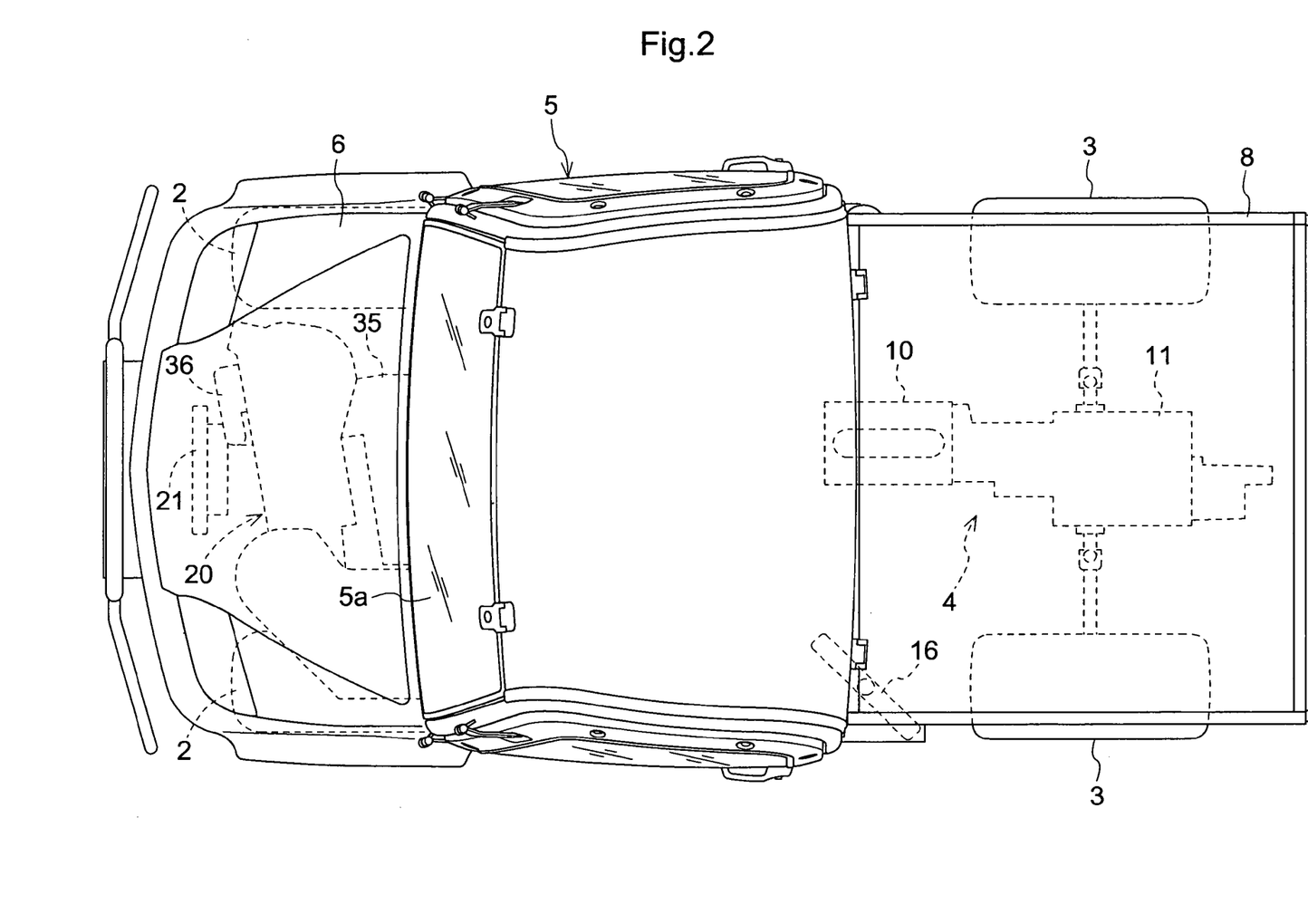
FIG. 2 is an overall plan view of the work vehicle.

FIG. 1 shows a side view of a multi-purpose vehicle as an example of a work vehicle. FIG. 2 shows a plan view of the multi-purpose vehicle. This work vehicle basically includes: a body frame 1 with a stepped shape in which a front portion is lower than a rear portion; laterally steerable front wheels 2 independently suspended from the front portion of the body frame 1; laterally steerable rear wheels 3 independently suspended from the rear portion of the same; a power unit 4 located under the rear portion of the body frame 1; a cabin 5 serving as an operating unit located in the middle of the front-rear direction of the body frame 1; a hood 6 connected to a front end of the cabin 5 and mounted on the front portion of the body frame 1; and a load unit 8 located above the rear portion of the body frame 1 and capable of pivoting around a fulcrum p by a hydraulic cylinder 7.

The power unit 4 includes a mounting frame 9 located under the rear portion of the body frame 1 and supported in a vibration-isolating manner, an engine 10 and a transmission case 11 connected directly to the engine 10 located in front thereof, the engine 10 and the transmission case 11 being mounted on the mounting frame 9. While the power varied in speed in the transmission case 11 is transmitted to the right and left rear wheels 3, the right and left front wheels 2 are driven by the running power axially transmitted from the transmission case 11 to the front portion of the body, whereby four wheel drive is performed.

Figure 5:
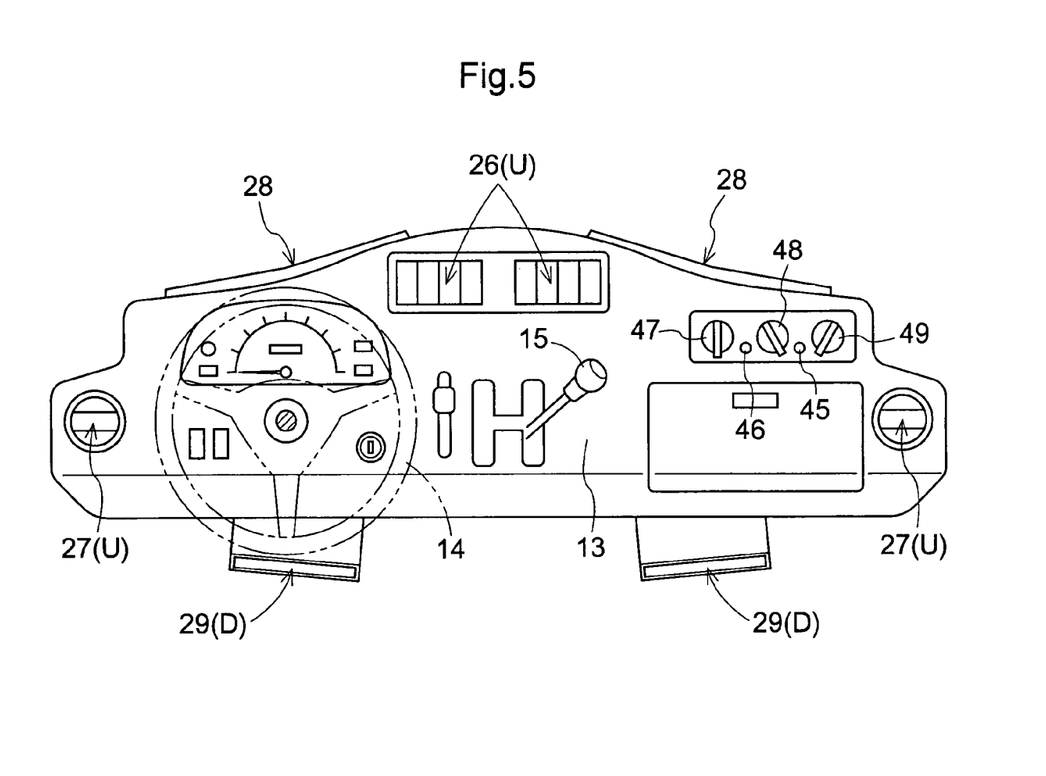
FIG. 5 is a front view of a dashboard.

In the cabin 5, a double seat 12 with an operator seat on the left and a passenger seat on the right is provided in the back, and a dashboard 13 is provided in the front. As shown in FIG. 5, driving controls and instruments including a steering wheel 14, a gear shift lever 15, etc. are provided on the left side of the dashboard 13. Although not shown, under the left side of the dashboard 13, an accelerator pedal and a brake pedal are provided on the floor.

Figure 3:
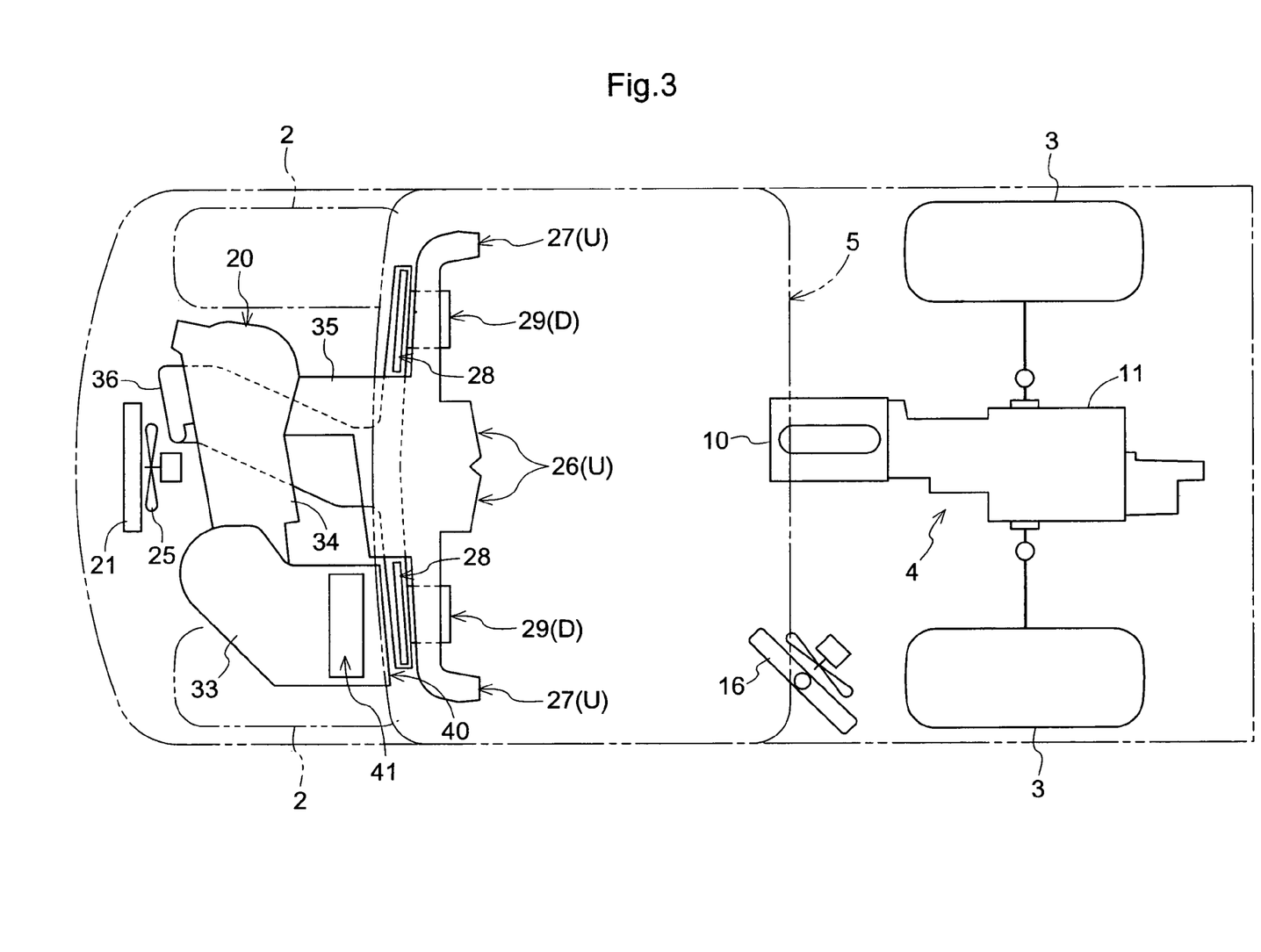
FIG. 3 is a plan view illustrating an arrangement of an air conditioner.
Figure 7:
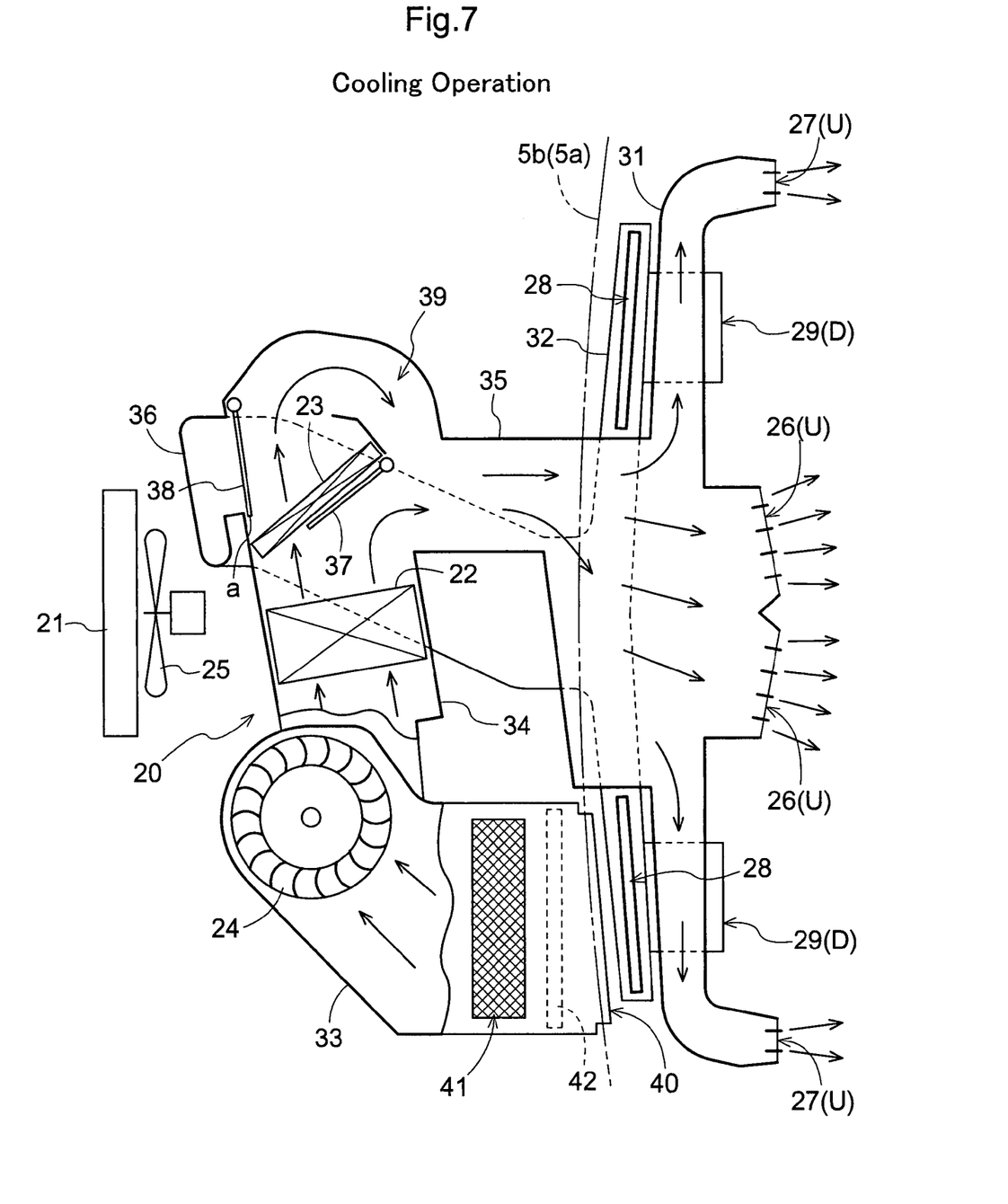
FIG. 7 is a plan view illustrating air flow in cooling operation mode.

The hood 6, which is capable of being opened and closed, includes air conditioning equipment such as an air conditioning unit 20, an air conditioning condenser 21, etc. as shown in FIG. 3. As shown in FIG. 7, the air conditioning unit 20 includes an evaporator 22 to which a refrigerant condensed in the condenser 21 is delivered, a heater 23 and a vertical type blowing fan 24 for blowing out conditioned air. The condenser 21 is cooled by an electric fan 25.

As shown in FIG. 5, a pair of right and left center grille outlets 26 serving as upper outlets U are provided at the upper center between the right and left sides of the dashboard 13. Side grille outlets 27 serving as another upper outlets U are provided near the right and left sides of the dashboard 13, respectively. A pair of right and left defrost grille outlets 28 are provided on the top of the dashboard 13. Under the dashboard 13, foot grille outlets 29 serving as lower outlets D are provided on the right and left sides, respectively.

The center grille outlets 26 and the side grille outlets 27 serving as the upper outlets U are capable of changing the flow direction of conditioned air, so that the operator on the left side and the passenger on the right side separately can control the flow direction according to their preferences. The defrost grille outlets 28 discharge conditioned air toward a windshield 5a to spread the conditioned air over the windshield 5a. The foot grille outlets 29 serving as the lower outlets D discharge conditioned air toward the feet of the operator and passenger.

Figure 4:
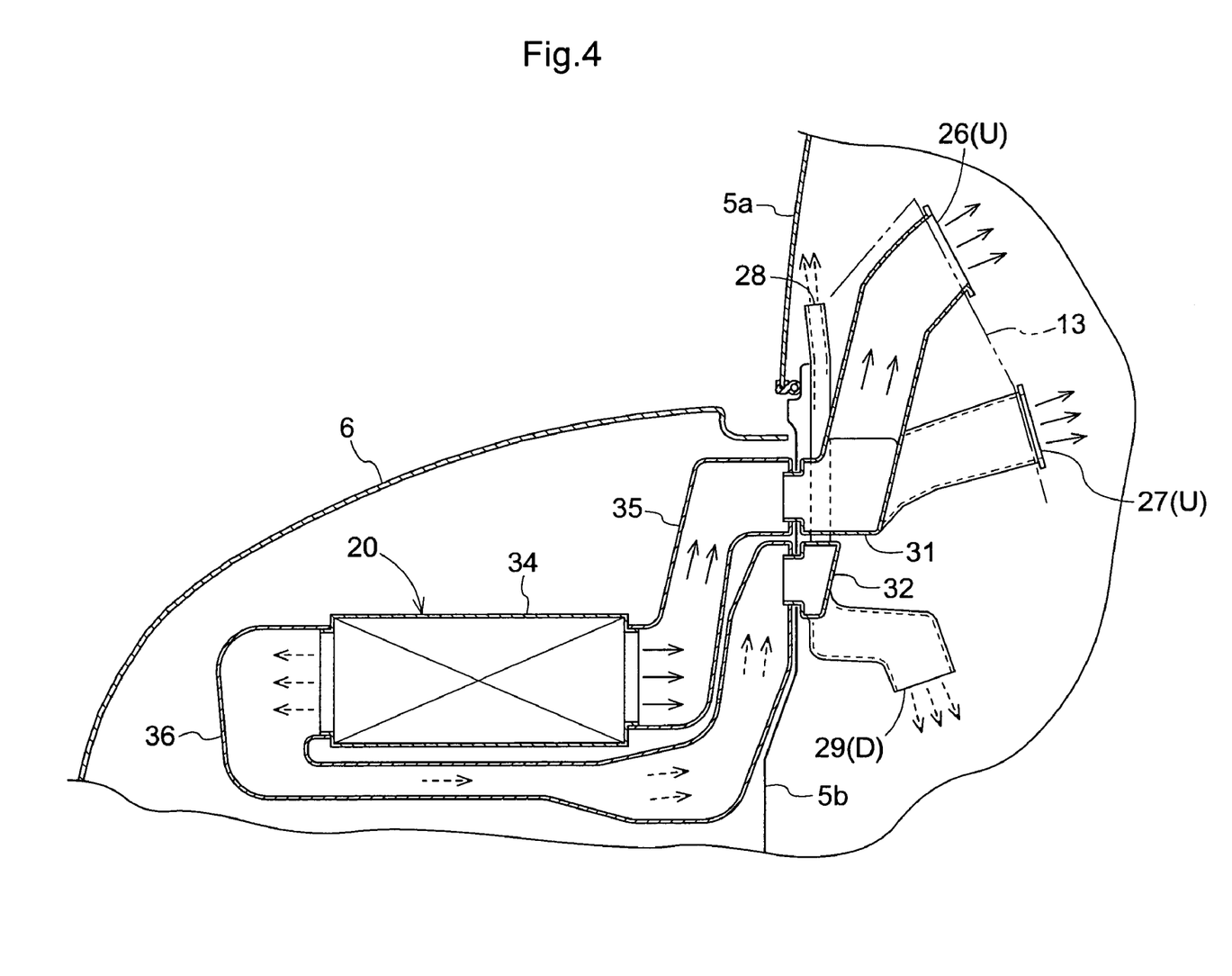
FIG. 4 is a vertical cross-sectional side view of the air conditioner.

As shown in FIG. 4, the center grille outlets 26 and the side grille outlets 27 are connected to a first internal duct 31 provided in the cabin, whereas the defrost grille outlets 28 and the foot grille outlets 29 are connected to a second internal duct 32 provided also in the cabin. Thereby, the air discharge path of the center grille outlets 26 and the side grille outlets 27 and that of the defrost grille outlets 28 and the foot grille outlets 29 are separated.

The air conditioning unit 20 includes an intake duct 33 connected to the blowing fan 24 and a main duct 34 for guiding the air blown from the blowing fan 24 to flow in the right direction of the body. An evaporator 22 is disposed in the upstream of the main duct 34, and a heater 23 is disposed in the downstream of the same. The main duct 34 is connected to a rear duct 35 that discharges conditioned air rearward and to a front duct 36 that discharges conditioned air frontward. The main duct 34 has a temperature control door 37 for controlling the amount of conditioned air discharged to the rear duct 35 and to the front duct 36, and an air discharge mode switching door 38. On the right side of the main duct 34, a bypass 39 that connects the downstream of the heater 23 and the rear duct 35 is provided.

On the lower left side of the dashboard 13, the intake duct 33 is communicated with an inside air inlet 40 having a filter attached thereto provided on the front wall 5b of the cabin. On the top surface of the intake duct 33, an outside air inlet 41 having a filter attached thereto is formed. The intake duct 33 has an intake air switching door 42 therein. By moving this intake air switching door 42, either the inside air of the cabin or the outside air in the hood is selected and introduced into the blowing fan 24.

In air conditioning operation mode, a constant amount of refrigerant flows constantly in the evaporator 22. Upon stopping the air conditioning operation mode, the flow of the refrigerant stops. The heater 23 circulates cooling water (hot water) flowing from a radiator 16 for cooling the engine provided in the power unit 4. The amount of hot water flowing into the heater 23 can be changed by adjusting the opening of a valve (not shown).

The rear duct 35 is communicated with the main duct 34 at a position between the evaporator 22 and the heater 23. The rear end of the rear duct 35 is communicated with the first internal duct 31 in the front wall 5b of the cabin. The front duct 36 is communicated with the main duct 34 in the downstream of the heater 23, and extends rearward under the main duct 34 to the front wall 5b, where the front duct 36 is communicated with the second internal duct 32.

Figure 6:
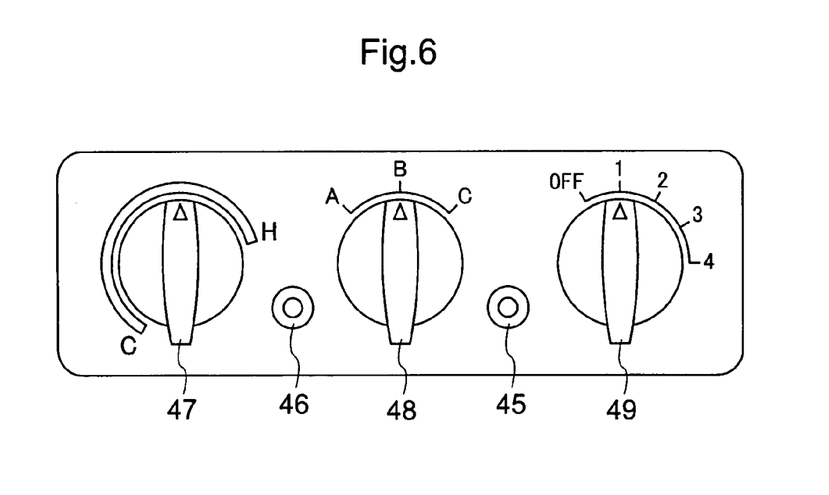
FIG. 6 is a front view of an air conditioner control unit.

As shown in FIGS. 5 and 6, on the right side of the dashboard 13, there are provided an air conditioning on/off switch 45, an inside/outside air shift switch 46 for causing the intake air switching door 42 to move, a temperature control dial 47, an air discharge mode selection dial 48 for selecting the position from which the conditioned air flows into the cabin, and an air flow control dial 49 for adjusting the amount of air flowing from the blowing fan 24 at five different settings (including off).

Figure 8:
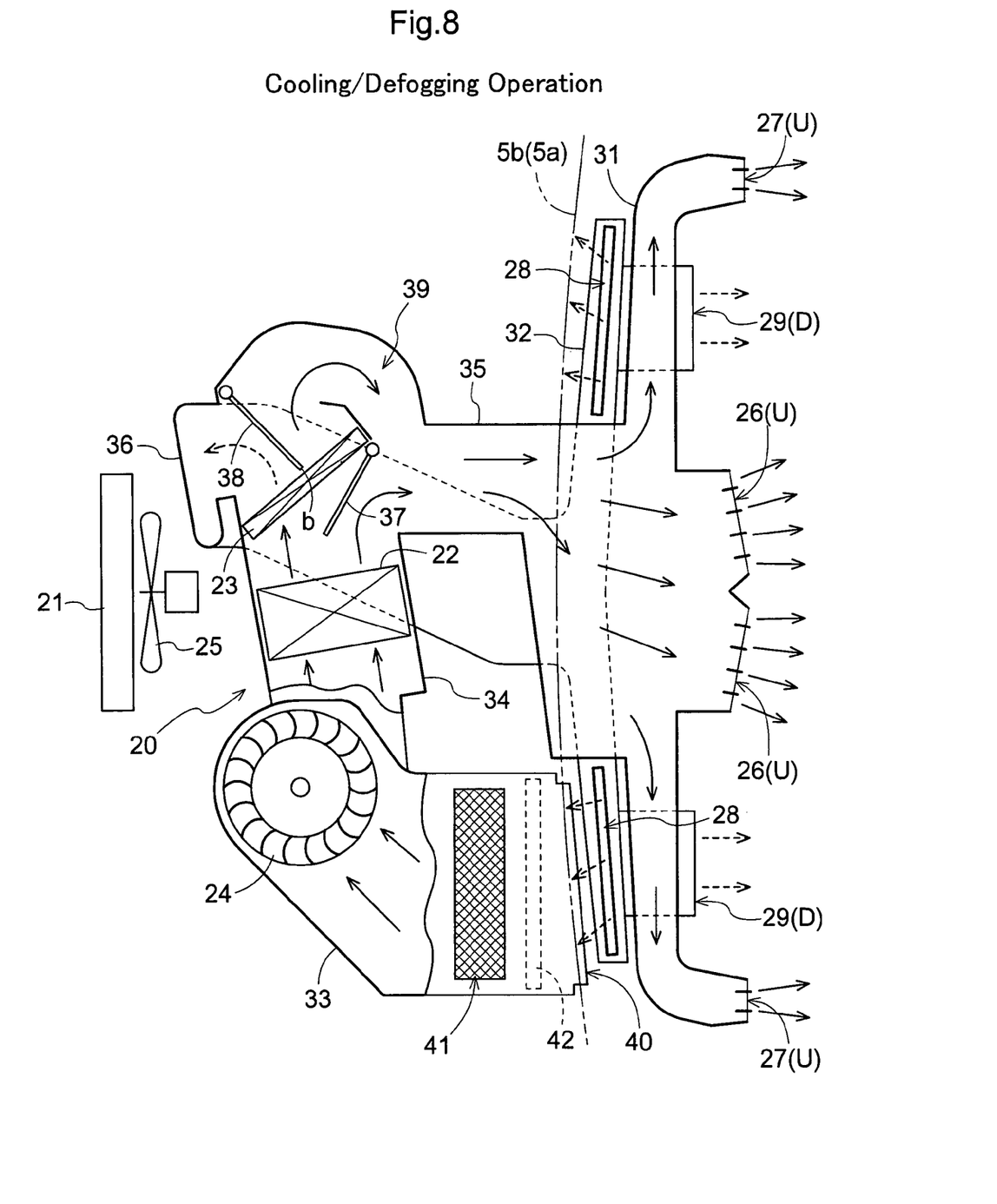
FIG. 8 is a plan view illustrating air flow in cooling/defrost operation mode.
Figure 9:
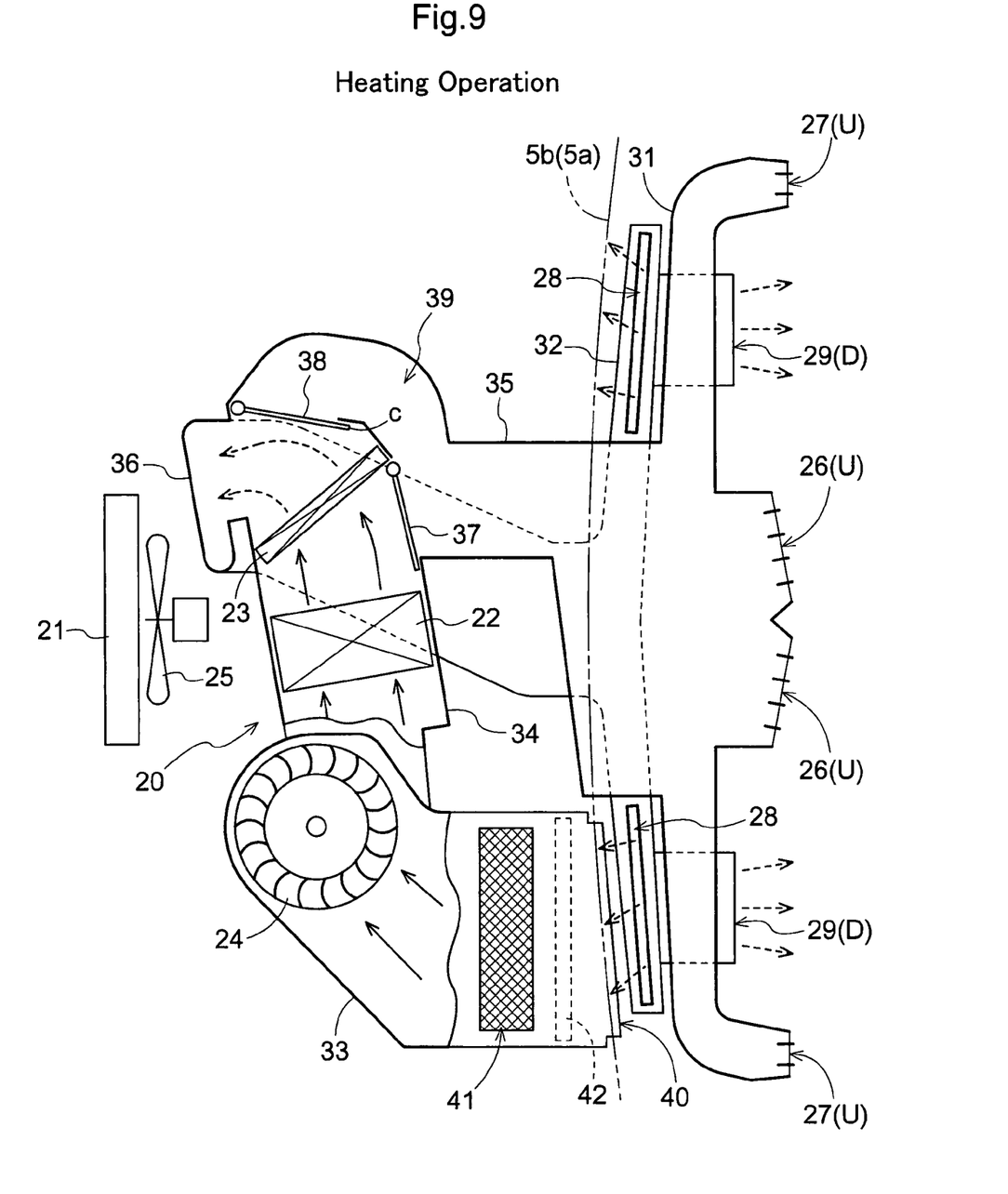
FIG. 9 is a plan view illustrating air flow in heating operation mode.

The air discharge mode selection dial 48 has three different positions (A), (B) and (C). When the position (A) is selected, the air discharge mode switching door 38 moves to the front closed position (a) as shown in FIG. 7. When the position (B) is selected, the air discharge mode switching door 38 moves to the middle position (b) as shown in FIG. 8. When the position (C) is selected, the air discharge mode switching door 38 moves to the rear closed position (c) as shown in FIG. 9. Examples of the operation will be described below.

In cooling operation, when the on/off switch 45 is turned on, the temperature control dial 47 is rotated to the cooling mode range on the left side, a desired amount of air flow is selected by the air flow control dial 49, and the air discharge mode selection dial 48 is set to the position (A), the air discharge mode switching door 38 moves to the front closed position (a), and the temperature control door 37 moves to a position corresponding to the set position of the temperature control dial 47 as shown in FIG. 7.

When the temperature control dial 47 is set to a middle position of the cooling mode range, the temperature control door 37 moves to a middle of its operative range. Thereby, most of the cooled air discharged from the evaporator 22 is delivered to the rear duct 35, and part of the cooled air discharged from the evaporator 22 is delivered through the heater 23 and the bypass 39 to the rear duct 35, where the cooled air not having passed through the heater is mixed with the heated air. The mixed air is then delivered to the center grille outlets 26 and the side grille outlets 27 from which the mixed air is discharged.

In this case, as the temperature control dial 47 is rotated toward the left in order to decrease the cooling temperature, the temperature control door 37 moves toward the open position (i.e., toward the heater), whereby the amount of air passing through the heater 23 is reduced. At the same time, the amount of hot water circulating into the heater 23 is reduced, reducing the amount of heated air to be mixed with the cooling air, and decreasing the temperature of the heated air flowing through the bypass 39. Thereby, cooled air adjusted to a temperature corresponding to the set position of the temperature control dial 47 is discharged from the center grille outlets 26 and the side grille outlets 27. When the temperature control dial 47 is rotated to the leftmost position in order to set to the maximum cooling temperature, the temperature control door 37 moves to a position where the temperature control door 37 and the front surface of the heater 23 are aligned, and the circulation of the hot water into the heater 23 is interrupted, and the cooled air having the lowest temperature is delivered to the rear duct 35.

During the cooling operation state, when the windshield 5a fogs up, by rotating the air discharge mode selection dial 48 to the position (B), the air discharge mode switching door 38 moves to the middle position (b) as shown in FIG. 8. Thereby, part of the heated air having passed through the heater 23 is delivered to the front duct 36, and then discharged from the defrost grille outlets 28 to remove the fog of the windshield 5a.

In heating operation, when the on/off switch 45 is turned on, the temperature control dial 47 is rotated to the heating mode range on the right side, a desired amount of air flow is selected by the air flow control dial 49, and the air discharge mode selection dial 48 is set to the position (C), the air discharge mode switching door 38 moves to the rear closed position (c), and the temperature control door 37 also moves to the closed position as shown in FIG. 9. At the same time, the circulation of the refrigerant into the evaporator 22 is interrupted. Accordingly, the air having passed through the evaporator 22 without being controlled in temperature is delivered through the heater 23 to the front duct 36, and finally discharged from the defrost grille outlets 28 and the foot grille outlets 29. In this case, as the temperature control dial 47 is rotated toward the right, the amount of hot water circulating into the heater 23 is increased, increasing the temperature of the heated air.

What is claimed is:

1. An air conditioning arrangement for a work vehicle having a cabin, the air conditioning arrangement comprising:
a hood disposed forwardly of the cabin;
an air conditioning unit housed under the hood forwardly of the cabin, the air conditioning unit comprising a main duct, a rear duct for delivering conditioned air rearward in a longitudinal direction of the vehicle and a front duct comprising a portion for delivering conditioned air frontward in the longitudinal direction of the vehicle, the front duct further comprising a portion extending rearward in the longitudinal direction of the vehicle under the air conditioning unit;
a dashboard provided in a front portion in the cabin, the dashboard comprising an upper outlet, a defrost outlet and a lower outlet, each of the upper outlet, the defrost outlet and the lower outlet being communicated with either one of the front duct and the rear duct;
an evaporator disposed in the main duct; and
a heater disposed downstream of the evaporator,
wherein the main duct is communicated with the rear duct at a position between the evaporator and the heater, and the main duct is communicated with the front duct downstream of the heater.

2. The air conditioning arrangement according to claim 1, wherein the upper outlet is communicated with the rear duct, and
the defrost outlet and the lower outlet are communicated with the front duct.

3. The air conditioning arrangement according to claim 1, wherein cooled air having passed through the evaporator and heated air having passed through the heater can be mixed and discharged from the rear duct, and
a temperature control door is disposed between the evaporator and the heater so as to change the mixing ratio of the cooled air and the heated air.

4. The air conditioning arrangement according to claim 3, further comprising:
an air discharge mode switching door that is disposed downstream of the heater and is capable of switching among a first state in which the heated air having passed through the heater is allowed to flow only to the front duct, a second state in which the heated air is allowed to flow to both the front duct and the rear duct, and a third state in which the heated air is allowed to flow only to the rear duct.

* * * * *